US008689872B2

(12) United States Patent
Welton et al.

(10) Patent No.: US 8,689,872 B2
(45) Date of Patent: Apr. 8, 2014

(54) METHODS AND COMPOSITIONS FOR CONTROLLING FORMATION FINES AND REDUCING PROPPANT FLOW-BACK

(75) Inventors: Thomas D. Welton, Duncan, OK (US); Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 367 days.

(21) Appl. No.: 11/782,190

(22) Filed: Jul. 24, 2007

(65) Prior Publication Data

US 2008/0011478 A1 Jan. 17, 2008

Related U.S. Application Data

(63) Continuation of application No. 11/178,896, filed on Jul. 11, 2005, now Pat. No. 7,318,474.

(51) Int. Cl.
*E21B 33/00* (2006.01)

(52) U.S. Cl.
USPC .................. 166/295; 166/285; 166/305.1

(58) Field of Classification Search
None
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | 166/4 |
| 3,047,067 A | 7/1962 | Williams et al. | 166/33 |
| 3,052,298 A | 9/1962 | Malott | |
| 3,070,165 A | 12/1962 | Stratton | |
| 3,123,138 A | 3/1964 | Robichaux | 166/33 |
| 3,173,484 A | 3/1965 | Huitt et al. | |
| 3,176,768 A | 4/1965 | Brandt et al. | 166/33 |
| 3,195,635 A | 7/1965 | Fast | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,302,719 A | 2/1967 | Fischer | |
| 3,308,885 A | 3/1967 | Sandiford | 166/33 |
| 3,308,886 A | 3/1967 | Evans | |
| 3,316,965 A | 5/1967 | Watanabe | 166/33 |
| 3,329,204 A | 7/1967 | Brieger | |
| 3,336,980 A | 8/1967 | Rike | 166/33 |
| 3,364,995 A | 1/1968 | Atkins et al. | |
| 3,366,178 A | 1/1968 | Malone et al. | |
| 3,375,872 A | 4/1968 | McLaughlin et al. | 166/29 |
| 3,378,074 A | 4/1968 | Kiel | |
| 3,404,735 A | 10/1968 | Young et al. | 166/33 |
| 3,415,320 A | 12/1968 | Young | 166/33 |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | 117/62.2 |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | 166/280 |
| 3,681,287 A | 8/1972 | Brown et al. | 260/67 |
| 3,708,013 A | 1/1973 | Dismukes | 166/276 |
| 3,709,298 A | 1/1973 | Pramann | 166/276 |
| 3,709,641 A | 1/1973 | Sarem | |
| 3,741,308 A | 6/1973 | Veley | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,769,070 A | 10/1973 | Schilt | |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,850,247 A | 11/1974 | Tinsley | |
| 3,854,533 A | 12/1974 | Gurley et al. | 166/276 |
| 3,857,444 A | 12/1974 | Copeland | 166/276 |
| 3,861,467 A | 1/1975 | Harnsberger | |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,902,557 A | 9/1975 | Shaughnessy et al. | 166/295 |
| 3,912,692 A | 10/1975 | Casey et al. | 260/78.3 |
| 3,933,205 A | 1/1976 | Kiel | |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | |

(Continued)

FOREIGN PATENT DOCUMENTS

| | | | | |
|---|---|---|---|---|
| CA | 2063877 | 5/2003 | | |
| EP | 0313243 B1 | 10/1988 | | E21B 43/02 |

(Continued)

OTHER PUBLICATIONS

Remediation. Dictionary.com. The American Heritage® Dictionary of the English Language, Fourth Edition. Houghton Mifflin Company, 2004. http://dictionary.reference.com/browse/remediation (accessed: Nov. 10, 2008). Definition is copied into body of office action.*
"Santrol Bioballs"; http://www.fairmounminerals.com/.sub.--SANTROL/SANTROL%20Web%20Site/B.sub- .--TD.htm., Sep. 30, 2004.
International Search Report and Opinion (PCT/GB2004002412), Sep. 16, 2004.
International Search Report and Opinion (PCT/GB2005/003845), Jul. 31, 2006.
International Search Report and (PCT/GB2005/004009), Jan. 11, 2006.

(Continued)

*Primary Examiner* — Angela M DiTrani
(74) *Attorney, Agent, or Firm* — Craig W. Roddy; McDermott Will & Emery LLP

(57) ABSTRACT

Provided herein are methods for controlling the migration of particulates within a portion of a subterranean formation that comprise aqueous tackifying treatment fluids, curable resin compositions, and/or noncurable resin compositions.

5 Claims, No Drawings

(56) References Cited

U.S. PATENT DOCUMENTS

| | | | |
|---|---|---|---|
| 4,008,763 A | 2/1977 | Lowe et al. | 166/253 |
| 4,015,995 A | 4/1977 | Hess | 106/287 |
| 4,018,285 A | 4/1977 | Watkins et al. | |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,060,988 A | 12/1977 | Arnold | |
| 4,068,718 A | 1/1978 | Cooke, Jr. et al. | |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,085,802 A | 4/1978 | Sifferman et al. | |
| 4,089,437 A | 5/1978 | Chutter et al. | |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A | 1/1981 | Constien | |
| 4,259,205 A | 3/1981 | Murphey | |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,392,988 A | 7/1983 | Dobson et al. | |
| 4,399,866 A | 8/1983 | Dearth | |
| 4,415,805 A | 11/1983 | Fertl et al. | 250/260 |
| 4,428,427 A | 1/1984 | Friedman | |
| 4,439,489 A | 3/1984 | Johnson et al. | 428/404 |
| 4,441,556 A | 4/1984 | Powers et al. | |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/280 |
| 4,669,543 A | 6/1987 | Young | 166/276 |
| 4,670,501 A | 6/1987 | Dymond et al. | |
| 4,675,140 A | 6/1987 | Sparks et al. | 264/4.3 |
| 4,681,165 A | 7/1987 | Bannister | |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | |
| 4,777,200 A | 10/1988 | Dymond et al. | |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,070 A | 6/1989 | Sharp | |
| 4,842,072 A | 6/1989 | Friedman et al. | 166/295 |
| 4,843,118 A | 6/1989 | Lai et al. | 524/555 |
| 4,846,118 A | 7/1989 | Slattery et al. | |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,875,525 A | 10/1989 | Mana | |
| 4,886,354 A | 12/1989 | Welch et al. | 356/70 |
| 4,888,240 A | 12/1989 | Graham et al. | 428/403 |
| 4,892,147 A | 1/1990 | Jennings, Jr. et al. | |
| 4,895,207 A | 1/1990 | Friedman et al. | 166/276 |
| 4,898,750 A | 2/1990 | Friedman et al. | |
| 4,903,770 A | 2/1990 | Friedman et al. | 166/288 |
| 4,921,576 A | 5/1990 | Hurd | |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,984,635 A | 1/1991 | Cullick et al. | |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,056,597 A | 10/1991 | Stowe, III et al. | |
| 5,082,056 A | 1/1992 | Tackett, Jr. | 166/295 |
| 5,095,987 A | 3/1992 | Weaver et al. | |
| 5,105,886 A | 4/1992 | Strubhar | 166/280.1 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,244,362 A | 9/1993 | Conally et al. | |
| 5,247,059 A | 9/1993 | Gruber et al. | 528/354 |
| 5,249,627 A | 10/1993 | Harms et al. | |
| 5,249,628 A | 10/1993 | Surjaatmadja | 166/305 |
| 5,256,729 A | 10/1993 | Kutts et al. | 524/700 |
| 5,265,678 A | 11/1993 | Grundmann | |
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,377,756 A | 1/1995 | Northrop et al. | |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,390,741 A | 2/1995 | Payton et al. | |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |

(56) References Cited

U.S. PATENT DOCUMENTS

| | | | |
|---|---|---|---|
| 5,403,822 A | 4/1995 | Mueller et al. | |
| 5,420,174 A * | 5/1995 | Dewprashad | 523/130 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,177 A | 2/1996 | Yeh et al. | 166/295 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/200 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | |
| 5,639,806 A | 6/1997 | Johnson et al. | 523/208 |
| 5,663,123 A | 9/1997 | Goodhue, Jr. et al. | |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,697,448 A | 12/1997 | Johnson | |
| 5,698,322 A | 12/1997 | Tsai et al. | 428/373 |
| 5,701,956 A | 12/1997 | Hardy et al. | |
| 5,712,314 A | 1/1998 | Surles et al. | 521/41 |
| 5,732,364 A | 3/1998 | Kalb et al. | 588/8 |
| 5,738,136 A | 4/1998 | Rosenberg | |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/276 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,836,393 A | 11/1998 | Johnson | |
| 5,837,656 A | 11/1998 | Sinclair et al. | 507/220 |
| 5,837,785 A | 11/1998 | Kinsho et al. | 525/527 |
| 5,839,510 A * | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A * | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A * | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,901,789 A | 5/1999 | Donnelly et al. | |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,944,106 A | 8/1999 | Dalrymple et al. | |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,784 A | 10/1999 | Ryan | |
| 5,960,877 A | 10/1999 | Funkhouser et al. | 166/270 |
| 5,960,878 A | 10/1999 | Nguyen et al. | |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,969,823 A | 10/1999 | Wurz et al. | |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A * | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,063,738 A | 5/2000 | Chatterji et al. | |
| 6,068,055 A | 5/2000 | Chatterji et al. | 166/293 |
| 6,069,117 A | 5/2000 | Onan et al. | 507/202 |
| 6,070,667 A | 6/2000 | Gano | |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,131,661 A | 10/2000 | Conner et al. | |
| 6,135,987 A | 10/2000 | Tsai et al. | 604/365 |
| 6,140,446 A | 10/2000 | Fujiki et al. | 528/15 |
| 6,143,698 A | 11/2000 | Murphey et al. | |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,165,947 A | 12/2000 | Chang et al. | |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,186,228 B1 | 2/2001 | Wegener et al. | |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |

(56) References Cited

U.S. PATENT DOCUMENTS

| | | | |
|---|---|---|---|
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,310,008 B1 | 10/2001 | Rietjens | |
| 6,311,773 B1 | 11/2001 | Todd et al. | 166/280 |
| 6,315,040 B1 | 11/2001 | Donnelly | |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,342,467 B1 | 1/2002 | Chang et al. | |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,394,181 B2 | 5/2002 | Schnatzmeyer et al. | |
| 6,401,817 B1 | 6/2002 | Griffith et al. | 166/295 |
| 6,405,796 B1 | 6/2002 | Meyer et al. | |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,415,509 B1 | 7/2002 | Echols et al. | |
| 6,422,183 B1 | 7/2002 | Kato | |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,457,518 B1 | 10/2002 | Castano-Mears et al. | |
| 6,458,885 B1 | 10/2002 | Stengal et al. | 524/507 |
| 6,478,092 B2 | 11/2002 | Voll et al. | |
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,510,896 B2 | 1/2003 | Bode et al. | |
| 6,520,255 B2 | 2/2003 | Tolman et al. | |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,534,449 B1 | 3/2003 | Gilmour et al. | |
| 6,536,939 B1 | 3/2003 | Blue | |
| 6,538,576 B1 | 3/2003 | Schultz et al. | 340/859.6 |
| 6,543,545 B1 | 4/2003 | Chatterji et al. | 166/381 |
| 6,550,959 B2 | 4/2003 | Huber et al. | |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,588,926 B2 | 7/2003 | Huber et al. | |
| 6,588,928 B2 | 7/2003 | Huber et al. | |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,609,578 B2 | 8/2003 | Patel et al. | |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,778 B1 | 10/2003 | Ayoub et al. | 507/202 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,677,426 B2 | 1/2004 | Noro et al. | |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | 166/281 |
| 6,705,440 B2 | 3/2004 | Phelan et al. | |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,930 B2 | 4/2004 | Boney et al. | |
| 6,725,931 B2 | 4/2004 | Nguyen et al. | 166/280.2 |
| 6,729,404 B2 | 5/2004 | Nguyen et al. | 166/280.2 |
| 6,729,405 B2 | 5/2004 | DiLullo et al. | |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,235 B1 | 8/2004 | England | |
| 6,776,236 B1 | 8/2004 | Nguyen | 166/279 |
| 6,832,650 B2 | 12/2004 | Nguyen et al. | 166/279 |
| 6,832,655 B2 | 12/2004 | Ravensbergen et al. | |
| 6,837,309 B2 | 1/2005 | Boney et al. | |
| 6,851,474 B2 | 2/2005 | Nguyen | 166/279 |
| 6,866,099 B2 | 3/2005 | Nguyen | |
| 6,881,709 B2 | 4/2005 | Nelson et al. | |
| 6,887,834 B2 | 5/2005 | Nguyen et al. | 507/221 |
| 6,962,200 B2 | 11/2005 | Nguyen et al. | |
| 6,978,836 B2 | 12/2005 | Nguyen et al. | 166/295 |
| 6,997,259 B2 | 2/2006 | Nguyen | |
| 7,013,976 B2 | 3/2006 | Nguyen et al. | |
| 7,017,665 B2 | 3/2006 | Nguyen | |
| 7,025,134 B2 | 4/2006 | Byrd et al. | |
| 7,028,774 B2 | 4/2006 | Nguyen et al. | 166/295 |
| 7,032,667 B2 | 4/2006 | Nguyen et al. | |
| 7,036,589 B2 | 5/2006 | Nguyen | |
| 7,040,403 B2 | 5/2006 | Nguyen et al. | |
| 7,059,406 B2 | 6/2006 | Nguyen | |
| 7,063,150 B2 | 6/2006 | Slabaugh et al. | |
| 7,063,151 B2 | 6/2006 | Nguyen et al. | |
| 7,066,258 B2 | 6/2006 | Justus et al. | |
| 7,073,581 B2 | 7/2006 | Nguyen et al. | |
| 7,080,688 B2 | 7/2006 | Todd et al. | |
| 7,081,439 B2 | 7/2006 | Sullivan et al. | |
| 7,093,658 B2 | 8/2006 | Chatterji et al. | |
| 7,104,325 B2 | 9/2006 | Nguyen et al. | |
| 7,114,560 B2 | 10/2006 | Nguyen et al. | |
| 7,114,570 B2 | 10/2006 | Nguyen et al. | |
| 7,117,942 B2 | 10/2006 | Dalrymple et al. | |
| 7,131,491 B2 | 11/2006 | Blauch et al. | |
| 7,153,575 B2 | 12/2006 | Anderson et al. | |
| 7,156,194 B2 | 1/2007 | Nguyen | |
| 7,178,596 B2 | 2/2007 | Blauch et al. | |
| 7,204,311 B2 | 4/2007 | Welton et al. | |
| 7,210,528 B1 | 5/2007 | Brannon et al. | |
| 7,216,711 B2 | 5/2007 | Nguyen et al. | |
| 7,252,146 B2 | 8/2007 | Slabaugh et al. | |
| 7,261,156 B2 | 8/2007 | Nguyen et al. | |
| 7,264,051 B2 | 9/2007 | Nguyen et al. | |
| 7,264,052 B2 | 9/2007 | Nguyen et al. | |

(56) References Cited

U.S. PATENT DOCUMENTS

| | | | |
|---|---|---|---|
| 7,267,717 B2 | 9/2007 | Watanabe et al. | |
| 7,273,099 B2 | 9/2007 | East, Jr. et al. | |
| 7,281,581 B2 | 10/2007 | Nguyen et al. | |
| 7,306,037 B2 | 12/2007 | Nguyen et al. | |
| 7,343,973 B2 | 3/2008 | Dusterhoft et al. | |
| 2001/0016562 A1 | 8/2001 | Muir et al. | 507/201 |
| 2002/0036088 A1 | 3/2002 | Todd | |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2002/0104217 A1 | 8/2002 | Echols et al. | |
| 2002/0160920 A1 | 10/2002 | Dawson et al. | |
| 2002/0169085 A1 | 11/2002 | Miller et al. | |
| 2002/0189808 A1 | 12/2002 | Nguyen et al. | |
| 2003/0006036 A1 | 1/2003 | Malone et al. | 166/250.12 |
| 2003/0013871 A1 | 1/2003 | Mallon et al. | |
| 2003/0060374 A1 | 3/2003 | Cooke, Jr. | 507/200 |
| 2003/0106690 A1 | 6/2003 | Boney et al. | |
| 2003/0114314 A1 | 6/2003 | Ballard et al. | 507/100 |
| 2003/0114317 A1 | 6/2003 | Benton et al. | |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | |
| 2003/0205376 A1 | 11/2003 | Ayoub et al. | 166/254.2 |
| 2003/0213113 A1 | 11/2003 | McMillan et al. | 29/281.1 |
| 2003/0230408 A1 | 12/2003 | Acock et al. | 166/297 |
| 2003/0230431 A1 | 12/2003 | Reddy et al. | |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040712 A1 | 3/2004 | Ravi et al. | |
| 2004/0040713 A1 | 3/2004 | Nguyen et al. | 166/295 |
| 2004/0043906 A1 | 3/2004 | Heath et al. | |
| 2004/0045712 A1 | 3/2004 | Eoff et al. | |
| 2004/0048752 A1 | 3/2004 | Nguyen et al. | 507/269 |
| 2004/0055747 A1 | 3/2004 | Lee | 166/278 |
| 2004/0060702 A1 | 4/2004 | Kotlar et al. | |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0152602 A1 | 8/2004 | Boles | |
| 2004/0177961 A1 | 9/2004 | Nguyen et al. | 166/280.2 |
| 2004/0182576 A1 | 9/2004 | Reddy et al. | 166/295 |
| 2004/0194960 A1 | 10/2004 | DiLullo et al. | |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256097 A1 | 12/2004 | Byrd et al. | 166/90.1 |
| 2004/0256099 A1 | 12/2004 | Nguyen et al. | 166/249 |
| 2004/0261993 A1 | 12/2004 | Nguyen | |
| 2004/0261995 A1 | 12/2004 | Nguyen et al. | 166/279 |
| 2004/0261997 A1 | 12/2004 | Nguyen et al. | 166/281 |
| 2004/0261999 A1 | 12/2004 | Nguyen | |
| 2005/0000694 A1 | 1/2005 | Dalrymple et al. | |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0028976 A1 | 2/2005 | Nguyen | |
| 2005/0028979 A1 | 2/2005 | Brannon et al. | |
| 2005/0034862 A1 | 2/2005 | Nguyen et al. | 166/281 |
| 2005/0034865 A1 | 2/2005 | Todd et al. | |
| 2005/0045326 A1 | 3/2005 | Nguyen et al. | 166/278 |
| 2005/0045330 A1 | 3/2005 | Nguyen et al. | 166/281 |
| 2005/0045384 A1 | 3/2005 | Nguyen et al. | 175/72 |
| 2005/0049151 A1 | 3/2005 | Nguyen et al. | 507/203 |
| 2005/0051322 A1 | 3/2005 | Speer | |
| 2005/0051331 A1 | 3/2005 | Nguyen et al. | 166/280.2 |
| 2005/0051332 A1 | 3/2005 | Nguyen et al. | 166/281 |
| 2005/0059555 A1 | 3/2005 | Dusterhoft et al. | 507/100 |
| 2005/0059558 A1* | 3/2005 | Blauch et al. | 507/203 |
| 2005/0061509 A1 | 3/2005 | Nguyen et al. | 166/307 |
| 2005/0092489 A1 | 5/2005 | Welton et al. | 166/280.2 |
| 2005/0126780 A1 | 6/2005 | Todd et al. | |
| 2005/0139359 A1 | 6/2005 | Maurer et al. | |
| 2005/0145385 A1 | 7/2005 | Nguyen et al. | 166/279 |
| 2005/0173116 A1 | 8/2005 | Nguyen et al. | 166/280.2 |
| 2005/0178551 A1 | 8/2005 | Tolman et al. | |
| 2005/0194135 A1 | 9/2005 | Nguyen et al. | |
| 2005/0194136 A1 | 9/2005 | Nguyen et al. | |
| 2005/0194137 A1 | 9/2005 | Nguyen et al. | |
| 2005/0194140 A1 | 9/2005 | Dalrymple et al. | |
| 2005/0194142 A1 | 9/2005 | Nguyen et al. | 166/280.2 |
| 2005/0197258 A1 | 9/2005 | Nguyen | |
| 2005/0207001 A1 | 9/2005 | Laufer et al. | |
| 2005/0257929 A1 | 11/2005 | Nguyen et al. | |
| 2005/0263283 A1 | 12/2005 | Nguyen et al. | 166/281 |
| 2005/0267001 A1 | 12/2005 | Weaver et al. | 507/219 |
| 2005/0269086 A1 | 12/2005 | Nguyen et al. | 166/281 |
| 2005/0269101 A1 | 12/2005 | Stegent et al. | 166/308.2 |
| 2005/0274510 A1 | 12/2005 | Nguyen et al. | 166/250.12 |
| 2005/0274517 A1* | 12/2005 | Blauch et al. | 166/280.2 |
| 2005/0274520 A1 | 12/2005 | Nguyen et al. | |
| 2005/0277554 A1 | 12/2005 | Blauch et al. | 507/224 |
| 2005/0284632 A1 | 12/2005 | Dalrymple et al. | |
| 2005/0284637 A1 | 12/2005 | Stegent et al. | 166/308.1 |
| 2006/0048943 A1 | 3/2006 | Parker et al. | 166/308.1 |
| 2006/0048944 A1 | 3/2006 | van Batenburg et al. | 166/308.1 |
| 2006/0052251 A1 | 3/2006 | Anderson et al. | |
| 2006/0089266 A1 | 4/2006 | Dusterhoft et al. | 260/78.3 |
| 2006/0113078 A1 | 6/2006 | Nguyen et al. | |
| 2006/0124303 A1 | 6/2006 | Nguyen et al. | 166/280.1 |
| 2006/0124309 A1 | 6/2006 | Nguyen et al. | |
| 2006/0137875 A1 | 6/2006 | Dusterhoft et al. | |
| 2006/0157243 A1 | 7/2006 | Nguyen et al. | 166/280.2 |
| 2006/0175058 A1 | 8/2006 | Nguyen et al. | 166/280.2 |
| 2006/0219405 A1 | 10/2006 | Nguyen et al. | |
| 2006/0219408 A1 | 10/2006 | Nguyen et al. | |
| 2006/0234874 A1 | 10/2006 | Eoff et al. | |
| 2006/0240994 A1 | 10/2006 | Eoff et al. | |
| 2006/0240995 A1 | 10/2006 | Rickman et al. | |
| 2006/0260810 A1 | 11/2006 | Weaver et al. | |
| 2006/0260813 A1 | 11/2006 | Welton et al. | |
| 2006/0264332 A1 | 11/2006 | Welton et al. | |
| 2006/0266522 A1 | 11/2006 | Eoff et al. | |
| 2006/0283592 A1 | 12/2006 | Sierra et al. | |
| 2006/0289160 A1 | 12/2006 | van Batenburg et al. | |
| 2007/0007010 A1 | 1/2007 | Welton et al. | |
| 2007/0012445 A1 | 1/2007 | Nguyen et al. | |
| 2007/0029087 A1 | 2/2007 | Nguyen et al. | |
| 2007/0114032 A1 | 5/2007 | Stegent et al. | |
| 2007/0131422 A1 | 6/2007 | Gatlin et al. | |
| 2007/0131425 A1 | 6/2007 | Gatlin et al. | |
| 2008/0006406 A1 | 1/2008 | Nguyen et al. | |

FOREIGN PATENT DOCUMENTS

| | | | |
|---|---|---|---|
| EP | 0528595 A1 | 8/1992 | C08G 59/18 |
| EP | 0506934 | 10/1992 | |
| EP | 0510762 A2 | 11/1992 | C11D 17/00 |
| EP | 0643196 A2 | 6/1994 | E21B 43/02 |
| EP | 0834644 A2 | 4/1998 | E21B 43/02 |
| EP | 0853186 A2 * | 7/1998 | E21B 43/02 |
| EP | 0853186 A2 | 7/1998 | E21B 43/02 |
| EP | 0864726 A2 | 9/1998 | E21B 43/26 |
| EP | 0879935 B1 | 11/1998 | E21B 43/26 |
| EP | 0933498 A1 | 8/1999 | E21B 43/02 |
| EP | 1001133 A1 | 5/2000 | E21B 43/26 |
| EP | 1132569 A2 | 9/2001 | E21B 43/02 |
| EP | 1326003 A1 | 7/2003 | E21B 43/267 |
| EP | 1362978 A1 | 11/2003 | E21B 43/02 |
| EP | 1394355 A1 | 3/2004 | E21B 43/267 |

(56) References Cited

FOREIGN PATENT DOCUMENTS

| | | | |
|---|---|---|---|
| EP | 1396606 A2 | 3/2004 | ............ E21B 43/267 |
| EP | 1398640 A1 | 3/2004 | ............ E21B 43/267 |
| EP | 1403466 A2 | 3/2004 | ............ E21B 43/267 |
| EP | 1464789 A1 | 10/2004 | ............ E21B 43/267 |
| EP | 1607572 | 12/2005 | |
| GB | 1107584 | 3/1968 | ................ E21D 5/00 |
| GB | 1264180 | 12/1969 | ................ E02D 3/14 |
| GB | 1292718 | 10/1972 | ............... C05G 3/00 |
| GB | 2298440 | 9/1996 | |
| GB | 2382143 A | 4/2001 | |
| WO | WO 93/15127 | 8/1993 | ............. C08G 63/06 |
| WO | WO 94/07949 | 4/1994 | ............. C08G 11/00 |
| WO | WO 94/08078 | 4/1994 | ................ D01F 6/62 |
| WO | WO 94/08090 | 4/1994 | ............. D21H 19/28 |
| WO | WO 95/09879 | 4/1995 | ............. C08G 63/08 |
| WO | WO 97/11845 | 4/1997 | .............. B32B 27/08 |
| WO | WO 99/27229 | 6/1999 | ............. E21B 43/26 |
| WO | WO 01/81914 | 11/2001 | ............. G01N 33/24 |
| WO | WO 01/87797 A1 | 11/2001 | ............. C04B 28/02 |
| WO | WO 02/12674 A1 | 2/2002 | ............. E21B 37/06 |
| WO | WO 03/027431 A1 | 4/2003 | ............. E21B 43/26 |
| WO | WO 2004/009956 | 1/2004 | |
| WO | WO 2004/037946 A1 | 5/2004 | ................ C09K 7/00 |
| WO | WO 2004/038176 A1 | 5/2004 | ............... E21B 43/27 |
| WO | WO 2004/083600 | 9/2004 | |
| WO | WO2004090281 | 10/2004 | |
| WO | WO2004104368 | 12/2004 | |
| WO | WO 2005/021928 A2 | 3/2005 | ............ E21B 33/138 |
| WO | WO 2005/024181 A1 | 3/2005 | |
| WO | WO2005080749 | 9/2005 | |
| WO | WO2006103385 | 10/2006 | |
| WO | WO2006116868 | 11/2006 | |

OTHER PUBLICATIONS

International Search Report (CPW 21582 EP), Mar. 11, 2005.
International Search Report and Opinion (PCT/GB2004/001497), Jul. 20, 2004.
International Search Report and Opinion (PCT/GB2004/001842), Dec. 10, 2004.
International Search Report and Opinion (PCT/GB2004/002674), Dec. 16, 2004.
International Search Report and Opinion (PCT/GB2004/002968), Nov. 16, 2004.
International Search Report and Opinion (PCT/GB2004/004242), Feb. 10, 2005.
International Search Report and Opinion (PCT/GB2004-000689), Jun. 4, 2004.
International Search Report and Opinion (PCT/GB2004/002727), Mar. 11, 2005.
International Search Report and Opinion (PCT/GB2004/002747), Mar. 11, 2005.
International Search Report and Opinion (PCT/GB2005/004010), Feb. 21, 2006.
International Search Report and Opinion (PCT/GB2006/004102), Feb. 20, 2007.
International Search Report and Opinion (PCT/GB2006/004137), Jun. 5, 2008.
International Search Report and Opinion (PCT/GB2006/004852), Mar. 7, 2007.
International Search Report and Opinion (PCT/GB2007/000467), Jun. 15, 2007.
International Search Report and Opinion (PCT/GB2006/000366), Jun. 22, 2006.
International Search Report and Opinion (PCT/GB2005/003747), Dec. 12, 2005.
International Search Report and Opinion (PCT/GB2007/000421), May 10, 2007.
Halliburton brochure entitled "INJECTROL A Component", 1999.
Halliburton brochure entitled "INJECTROL U Sealant", 1999.
International Search Report and Opinion (PCT/GB007/002273), Sep. 3, 2007.
International Search Report and Opinion (PCT/GB2004/002948), May 24, 2005.
International Search Report and Opinion (PCT/GB2005/000637), Feb. 6, 2005.
International Search Report and Opinion (PCT/GB2005/000634), Jun. 8, 2005.
International Preliminary Report on Patentability (PCT/GB2005/000634), Sep. 14, 2006.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., Controlling Proppant Flowback in High-Temperature, High-Production Wells, SPE 82215, May 2003.
Dusterhoft, et al., "Maximizing Effective Proppant Permeability Under High-Stress, High Gas-Rate Conditions," SPE 90398, Sep. 2004.
Notice of Allowance from U.S. Appl. No. 11/178,896, Oct. 25, 2007.
Office Action from U.S. Appl. No. 11/178,896, Nov. 17, 2006.
Office Action from U.S. Appl. No. 11/178,896, May 3, 2007.
Office action from U.S. Appl. No. 11/178,896, Jul. 10, 2007.
EPON Resin 828, Technical Data Sheet, Momentive, Sep. 2005, retrieved Nov. 2, 2012 from http://momentive.com/Products/TechnicalDataSheet.aspx?id=3942.
International Preliminary Report on Patentability for PCT/GB2006/002458 dated Jul. 27, 2010.
Halliburton, *CoalStm$^{SM}$ Service, Helps Boost Cash Flow From CBM Assets*, Stimulation, HO3679 Oct. 2003, Halliburton Communications.
Halliburton, *Conductivity Endurance Technology for High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton "*CobraFrac$^{SM}$ Service, Coiled Tubing Fracturing—Cost-Effective Method for Stimulating Untapped Reserves*", 2 pages, 2004.
Halliburton Cobra Frac Advertisement, 2001.
Halliburton "*SurgiFrac$^{SM}$*" *Service, a Quick and cost-Effective Method to Help Boost Production From Openhole Horizonal Completions*, 2002.
Halliburton, *Sand Wedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.
Nguyen et al., *A Novel Approach for Enhancing Proppant Consolidation: Laboratory Testing and Field Applications*, SPE Paper No. 77748, 2002.
SPE 15547, *Field Application of Lignosulfonate Gels to Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., Pressure Pulsing—An Improved Method of Waterflooding Fractured Reservoirs SPE 1788, 1957.
Raza, Water and Gas Cyclic Pulsing Method for Improved Oil Recovery, SPE 3005, 1971.
Peng et al., "Pressure Pulsing Waterflooding in Dual Porosity Naturally Fractured Reservoirs" SPE 17587, 1988.
Dusseault et al, "Pressure Pulse Workovers in Heavy Oil", SPE 79033, 2002.
Yang et al., "Experimental Study on Fracture Initiation by Pressure Pulse", SPE 63035, 2000.
Nguyen et al., New Guidelines for Applying Curable Resin-Coated Proppants, SPE Paper No. 39582, 1997.
Kazakov et al., "Optimizing and Managing Coiled Tubing Frac Strings" SPE 60747, 2000.
Advances in Polymer Science, vol. 157, "Degradable Aliphatic Polyesters" edited by A.-C. Alberston, 2001.

(56) References Cited

OTHER PUBLICATIONS

Gorman, Plastic Electric: Lining up the Future of Conducting Polymers Science News, vol. 163, May 17, 2003.
Gidley et al., "Recent Advances in Hydraulic Fracturing," Chapter 6, pp. 109-130, 1989.
Simmons et al., "Poly(phenyllactide): Synthesis, Characterization, and Hydrolytic Degradation, Biomacromolecules", vol. 2, No. 2, pp. 658-663, 2001.
Yin et al., "Preparation and Characterization of Substituted Polylactides", Americal Chemical Society, vol. 32, No. 23, pp. 7711-7718, 1999.
Yin et al., "Synthesis and Properties of Polymers Derived from Substituted Lactic Acids", American Chemical Society, Ch.12, pp. 147-159, 2001.
Cantu et al., "Laboratory and Field Evaluation of a Combined Fluid-Loss Control Additive and Gel Breaker for Fracturing Fluids," SPE 18211, 1990.
Love et al., "Selectively Placing Many Fractures in Openhole Horizontal Wells Improves Production", SPE 50422, 1998.
McDaniel et al. "Evolving New Stimulation Process Proves Highly Effective in Level 1 Dual-Lateral Completion" SPE 78697, 2002.
Albertsson et al.,"Aliphatic Polyesters: Synthesis, Properties and Applications", Advances in Polymer Science, vol. 57 Degradable Aliphatic Polyesters, 2002.
Dechy-Cabaret et al., "Controlled Ring-Operated Polymerization of Lactide and Glycolide" American Chemical Society, Chemical Reviews, A-Z, AA-AD, 2004.
Funkhouser et al., "Synthetic Polymer Fracturing Fluid for High-Temperature Applications", SPE 80236, 2003.
Chelating Agents, Encyclopedia of Chemical Technology, vol. 5 (764-795).
Vichaibun et al., "A New Assay for the Enzymatic Degradation of Polylactic Acid, Short Report", ScienceAsia, vol. 29, pp. 297-300, 2003.
CDX Gas, CDX Solution, 2003, CDX, LLC, Available @ www.cdxgas.com/solution.html, printed pp. 1-2, Feb. 16, 2005.
CDX Gas, "What is Coalbed Methane?" CDX, LLC. Available @ www.cdxcias.com/what.html, printed p. 1, Feb. 16, 2005.
Halliburton brochure entitled "H2Zero™ Service Introducing the Next Generation of cost-Effective Conformance Control Solutions", 2002.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "Sanfix® A Resin", 1999.
Halliburton brochure entitled "Pillar Frac Stimulation Technique" Fracturing Services Technical Data Sheet, 2 pages.
S.W. Almond et al "Factors Affecting Proppant Flowback with Resin Coated Proppants," Society of Petroleum Engineers, Inc., SPE 30096, p. 171-186, 1995.

* cited by examiner

METHODS AND COMPOSITIONS FOR CONTROLLING FORMATION FINES AND REDUCING PROPPANT FLOW-BACK

CROSS REFERENCE TO RELATED APPLICATIONS

This application is a continuation of U.S. patent application Ser. No. 11/178,896 filed Jul. 11, 2005, which issued as U.S. Pat. No. 7,318,474, entitled "Methods And Compositions For Controlling Formation Fines And Reducing Proppant Flow-Back," by Thomas D. Welton, et al., which is incorporated by reference herein for all purposes, from which priority is claimed pursuant to 35 U.S.C. §120.

BACKGROUND OF THE INVENTION

The present invention relates to methods and compositions for controlling the migration of particulates, (e.g., proppant and formation fines) within a portion of a subterranean formation. More particularly, the present invention relates to remedial and proactive methods (relative to a fracturing treatment) for controlling the migration of particulates in subterranean formations.

Hydraulic fracturing is a process commonly used to increase the flow of desirable fluids from subterranean formations, such as coal formations, carbonate formations, sandstone formations, shaly formations, and mixtures thereof. Traditional hydraulic fracturing operations comprise placing a viscous fracturing fluid into a portion of a subterranean formation at a rate and pressure such that fractures are formed or enhanced into the portion of the subterranean formation. The fractures tend to propagate as vertical and/or horizontal cracks located radially outward from the well bore. In such treatments, once the hydraulic pressure is released, the fractures formed will tend to close back onto themselves. To prevent this, oftentimes a particulate material, known as proppant, is placed in the fractures by suspending them in the fracturing fluid during at least a portion of the fracturing operation. The particulates are carried into created fractures and deposited therein such that when the hydraulic pressure is released the particulates act to prevent the fracture from fully closing, and thus, aid in forming conductive channels through which produced fluids may flow into the well bore. The term "propped fracture" as used herein refers to a fracture in a portion of subterranean formation that contains some proppant particulates. The term "proppant pack" refers to a collection of a mass of proppant particulates within a fracture. Without the particulate material, the fractures tend to close and reduce permeability gained by the fracturing operation. Suitable particulate materials should have sufficient compressive strength to resist crushing, but also must be sufficiently non-abrasive and non-angular to preclude cutting and imbedding into the formation.

Hydrocarbon wells are often located in subterranean zones that contain unconsolidated particulates (e.g., proppant and formation fines) that may migrate within the subterranean formation with the oil, gas, water, and/or other fluids produced by a well penetrating the subterranean formation. The presence of these unconsolidated particulates in produced fluids is disadvantageous and undesirable in that the particulates may abrade pumping and other producing equipment and reduce the fluid production capabilities of producing zones. Unconsolidated subterranean zones include those that contain loose particulates and those wherein the bonded particulates have insufficient bond strength to withstand the forces produced by the production of fluids through the zones. "Zone" as used herein simply refers to a portion of the formation and does not imply a particular geological strata or composition.

One traditional method of controlling unconsolidated particulates in zones of a subterranean formation involves placing a filtration bed containing gravel particulates near the well bore that neighbors the zone of interest. The filtration bed acts as a sort of physical barrier to the transport of unconsolidated particulates to the well bore that could be produced with the produced fluids. Typically, such so-called "gravel packing operations" involve the pumping and placement of a quantity of desired particulates into the unconsolidated formation in an area adjacent the well bore. One common type of gravel packing operation involves placing a sand control screen in the well bore and packing the annulus between the screen and the well bore with gravel of a specific size designed to prevent the passage of formation sand. The sand control screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated particulates. The resulting structure presents a barrier to migrating sand from the formation while still permitting fluid flow. When installing the gravel pack, the gravel is carried to the annulus in the form of a slurry by mixing the gravel with a viscous fluid, often known as a "gravel pack fluid." Once the gravel is placed in the well bore, the viscosity of the fluid is reduced, and it is returned to the surface. In some gravel packing operations, commonly known as "high rate water packing operations," the viscous fluid has a lower viscosity and yet the gravel remains in suspension because the treatment occurs at a high velocity. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Such packs may be time consuming and expensive to install.

Another method used to control particulates in unconsolidated formations involves consolidating unconsolidated portions of subterranean producing zones into relatively hard permeable masses by applying a resin followed by a spacer fluid and then a catalyst. Such methods may be problematic when, for example, an insufficient amount of spacer fluid is used between the application of the resin and the application of the external catalyst. In that case, the resin may come into contact with the external catalyst in the well bore itself rather than in the unconsolidated subterranean producing zone. Furthermore, there is uncertainty as to whether there is adequate contact between the resin and the catalyst. Additionally, when resin is contacted with an external catalyst an exothermic reaction occurs that may result in rapid polymerization, potentially damaging the formation by plugging the pore channels, halting pumping when the well bore is plugged with solid material, or resulting in a down hole explosion as a result of the heat of polymerization. Uniform placement of curable resin into the formations having long intervals is most desirable. However, formations often comprise a wide range of permeabilities even within a reservoir located along a well bore. As a result, completions involving resin consolidation, with conventional diversion techniques, have been applied in intervals of less than 50 feet, and more ideally, less than 30 feet. Also, using resins to consolidate long or large unconsolidated zones may not be practical due, at least in part, to the high cost of most suitable resins.

Another similar method involves applying a non-aqueous tackifying composition to the unconsolidated particulates in an effort to reduce the migration of particulates within the zone. Whereas a curable resin composition produces a hard mass, the use of a non-aqueous tackifying composition produces a more malleable consolidated mass.

Another alternative is an aqueous tackifying composition. Aqueous tackifying compositions, however, have their own problems including, but not limited to, the fact that they require external activators and surfactants for optimum performance.

SUMMARY OF THE INVENTION

The present invention relates to methods and compositions for controlling the migration of particulates, (e.g., proppant and formation fines) within a portion of a subterranean formation. More particularly, the present invention relates to remedial and proactive methods (relative to a fracturing treatment) for controlling the migration of particulates in subterranean formations.

In an embodiment, the present invention provides a remedial method of controlling particulates within a subterranean formation comprising: placing an aqueous tackifying treatment fluid into an unconsolidated zone of a subterranean formation; and placing a resin composition comprising a noncurable and/or curable resin composition into the unconsolidated zone.

In another embodiment, the present invention provides a method comprising: providing a resin composition that comprises a curable and/or a noncurable resin; placing the resin composition into a propped fracture that comprises proppant particulates; placing an aqueous tackifying treatment fluid into the propped fracture; and allowing the proppant particulates to form a permeable proppant pack.

In another embodiment, the present invention provides a proactive method of controlling particulates within a subterranean formation comprising: placing an aqueous tackifying treatment fluid before or as part of a pre-pad of a fracturing treatment; fracturing a portion of the subterranean formation to create at least a plurality of fractures in a portion of the formation; and introducing at least a plurality of resin-coated proppant particulates into a fracture created in the fracturing treatment.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions for controlling the migration of particulates, (e.g., proppant and formation fines) within a portion of a subterranean formation. More particularly, the present invention relates to remedial and proactive methods for controlling the migration of particulates in subterranean formations. Whether a particular method of this invention is "remedial" or "proactive" is determined relative to the timing of a fracturing treatment. The remedial methods are most suited for wells wherein a portion of the well has been fractured and propped. The particular type of fracturing treatment used is not relevant. The proactive methods are most suited for wells that have not yet been fractured and propped. These would include previously acidized or matrix wells. The proactive methods can be performed in conjunction with a fracturing treatment, if desired.

One of the many advantages of the present invention is that the methods eliminate the need for an activator when using curable resin compositions, which improves the flexibility and control of the operation. Another advantage is that the resultant hardened masses have better mechanical flexibility when compared to those formed with the use of curable resins.

A. The Remedial Methods of the Present Invention.

In some embodiments, the remedial methods of the present invention comprise two steps. The first step involves placing an aqueous tackifying treatment fluid into an unconsolidated zone of a subterranean formation. In this first step, the aqueous tackifying treatment fluid may disperse any loose fines within a proppant pack in a fracture, move any fines away from the fracture (or near well bore), and lock (or stabilize) the fines in place in the formation without causing damage to the permeability of the formation. This locking or stabilization is thought to immobilize the fines, and is often referred to as "fines control." In some embodiments, the aqueous tackifying treatment fluid will be placed into propped fractures within the unconsolidated zone of a subterranean formation. The second step involves placing a suitable noncurable resin composition or a curable resin composition (sometimes referred to collectively herein as a "resin composition") in substantially the same portion of the unconsolidated zone. In preferred embodiments, the noncurable resin composition or the curable resin composition will be "ultra-thin," which means it will have a low viscosity of about 1 cP to about 100 cP, preferably a viscosity of 20 cP or less, and most preferably a viscosity of 10 cP or less. The term "ultra-thin" as used herein means refers to resin compositions having a relatively low viscosity (e.g., 100 cP or less). The aqueous tackifying treatment fluid, the noncurable resin composition, and/or the curable resin composition stabilizes the mobile particulates located along the fracture faces in the unconsolidated zone into a stabilized mass. The term "stabilized mass" as used herein refers to an at least weakly consolidated structure that can withstand high flow rates but may have modest mechanical strength.

In some embodiments, the aqueous tackifying treatment fluid, the noncurable resin composition, or the curable resin composition will be injected into a propped fracture, and will at least partially consolidate the proppant particulates within the fracture to form a permeable proppant pack therein. In other embodiments, the remedial methods of controlling particulates within a subterranean formation of the present invention comprise the steps of: placing a resin composition (i.e., a curable or noncurable resin composition) into a propped fracture that comprises proppant particulates; placing an aqueous tackifying treatment fluid into the propped fracture; and allowing the proppant particulates to form a permeable proppant pack.

1. Suitable Aqueous Tackifying Treatment Fluids.

The aqueous tackifying treatment fluids used in some of the methods of this invention comprise an aqueous fluid and an aqueous tackifying agent. Additives such as scale inhibitors, breakers, solvents, and enzymes also may be added. Optionally, the aqueous tackifying treatment fluid may comprise additional components such as surfactants and/or activators. The choice of whether to include these optional components will be governed by, inter alia, the mineralogy of the formation and the composition of the resin composition used in the method.

Suitable aqueous base fluids include fresh water, salt water, brine, seawater, or any other aqueous liquid that does not adversely react with the other components used in accordance with this invention or with the subterranean formation. One should note that if the aqueous base fluid comprises a large concentration of salts, then those salts may act as an activator for the aqueous tackifying agent, which may not be desirable.

Suitable aqueous tackifying agents generally are charged polymers that comprise compounds that, when in an aqueous solvent or solution, will form a non-hardening coating (by themselves or with an activator). The aqueous tackifying agent may enhance the grain-to-grain contact between the individual particulates within the formation, helping bring about the consolidation of the particulates into a stabilized mass. Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. Methods of determining suitable aqueous tackifying agents and additional disclosure on aqueous tackifying agents can be found in U.S. patent application Ser. No. 10/864,061 and filed Jun. 9, 2004 and U.S. patent application Ser. No. 10/864,618 and filed Jun. 9, 2004 the relevant disclosures of which are hereby incorporated by reference. Others that may be suitable include those described in U.S. Pat. No. 5,249,627, the relevant disclosure of which is incorporated herein by reference.

Suitable surfactants may be included in the aqueous tackifying treatment fluid. The choice of whether to use a surfactant will be governed at least in part by the mineralogy of the formation. Generally, a surfactant may help facilitate coating of the fines by the treatment fluid. For instance, a hydrophobic polymer having a negative charge will preferentially attach to surfaces having a positive to neutral zeta potential and/or a hydrophillic surface. Therefore, in particular embodiments, a cationic surfactant may be included in a treatment fluid to facilitate application of the aqueous tackifying agent on the fines. As will be understood by those skilled in the art, amphoteric and zwitterionic surfactants also may be used so long as the conditions they are exposed to during use are such that they display the desired charge. For example, in particular embodiments, mixtures of cationic and amphoteric surfactants may be used. When used, the surfactant is present in an amount of from abut 0.1% to about 5% by weight of the aqueous tackifying treatment fluid.

In alternative embodiments, the treatment fluids of the present invention may be foamed. In such embodiments, the treatment fluids also comprise a gas and a foaming agent. While various gases can be utilized for foaming the treatment fluids of this invention, nitrogen, carbon dioxide, and mixtures thereof are preferred. In examples of such embodiments, the gas may be present in a treatment fluid in an amount in the range of from about 5% to about 95% by volume of the treatment fluid, and more preferably in the range of from about 20% to about 80%. The amount of gas to incorporate into the fluid may be affected by factors including the viscosity of the fluid and wellhead pressures involved in a particular application. Examples of preferred foaming agents that can be utilized to foam and stabilize the fluids of this invention include, but are not limited to, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Cocoamidopropyl betaine is especially preferred. Other suitable surfactants available from Halliburton Energy Services include: "19NTM," "G-Sperse Dispersant," "Morflo III®" surfactant, "Hyflo® IV M" surfactant, "Pen-88M™" surfactant, "HC-2™ Agent," "Pen-88 HTTM" surfactant, "SEM-7 ™" emulsifier, "Howco-Suds™" foaming agent, "Howco Sticks™" surfactant, "A-Sperse™" dispersing aid for acid additives, "SSO-21E" surfactant, and "SSO-21MW™" surfactant. Other suitable foaming agents and foam stabilizing agents may be included as well, which will be known to those skilled in the art with the benefit of this disclosure. The foaming agent is generally present in fluid of the present invention in an amount in the range of from about 0.1% to about 5% by weight, more preferably in the amount of from about 0.2% to about 1% and most preferably about 0.6%.

One advantage of using a foamed aqueous tackifying treatment fluid over a nonfoamed version is that less of the aqueous fluid may be needed, relatively speaking. This may be important in subterranean formations that are water-sensitive. In some embodiments, the foamed aqueous tackifying treatment fluids have a foam quality of about 30% or above. A preferred foam quality level is about 50% or above.

Optionally, the aqueous tackifying treatment fluids (including the foamed treatment fluids) may comprise a gelling agent. Any gelling agent suitable for use in subterranean applications may be used in these fluids, including, but not limited to, natural biopolymers, synthetic polymers, crosslinked gelling agents, viscoelastic surfactants, and the like. Guar and xanthan are examples of suitable gelling agents. A variety of gelling agents can be used in conjunction with the methods and compositions of the present invention, including, but not limited to, hydratable polymers that contain one or more functional groups such as hydroxyl, cis-hydroxyl, carboxylic acids, and derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives of all of the above. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the fluids of the present invention in an amount in the range of from about 0.1% to about 5% by weight of the aqueous fluid therein. In certain exemplary embodiments, the gelling agents are present in the fluids of the present invention in an amount in the range of from about 0.01% to about 2% by weight of the aqueous fluid therein. If a gelling agent is used, a suitable breaker may be necessary to ultimately reduce the viscosity of the fluid. Any breaker suitable for the subterranean formation and the gelling agent may be used. One of ordinary skill in the art with the benefit of this disclosure will recognize appropriate breakers to include.

2. Suitable Curable Resin Compositions.

The curable resin compositions suitable for use in the methods of the present invention comprise a resin and a solvent.

Resins suitable for use in the curable resin compositions of the present invention include all resins known in the art that are capable of forming a consolidating formation fines into a stabilized mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

The curable resin compositions suitable for use in the methods of the present invention preferably have a viscosity of about 1 cP to about 100 cP, more preferably a viscosity of 20 cP or less, and most preferably a viscosity of 10 cP or less. Although these resin compositions are especially preferred for use in the methods of the present invention due to, inter alia, pumping considerations, the formation conditions, viscosity, cost, and safety issues, any suitable resin should work.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents are those having high flash points (e.g., about 125° F.) because of, among other things, environmental and safety concerns. Such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

Regardless of the curable resin composition chosen, its viscosity should preferably be controlled to ensure that it is able to sufficiently penetrate the subterranean formation. A preferred depth of treatment may be from about one to about three well bore diameters; however, the laminate and/or non-uniform makeup of the formation, i.e., shale-sandstone-shale-sandstone, etc., may make reaching such a depth unrealistic. In some embodiments of the present invention, the curable resin composition should penetrate at least about 0.5 inches into the walls of the well bore. Ultra-thin curable resins are preferred.

When penetrating a proppant pack, the resin composition preferably should not penetrate the entire pack; from an economic point of view, preferably just the portion of the proppant pack closest to the well bore should be contacted by the resin composition. One should be mindful, however, that the proppant pack should have sufficient adhesion or consolidation strength to withstand high velocities associated with producing fluids.

3. Suitable Noncurable Resin Compositions

One type of noncurable resin compositions suitable for use comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as noncurable resin compositions include liquids and solutions of, for example, polyesters, polycarbonates and polycarbamates, natural resins such as shellac and the like. Other suitable noncurable resin compositions are described in U.S. Pat. No. 5,853,048 issued to Weaver, et al. and U.S. Pat. No. 5,833,000 issued to Weaver, et al., the relevant disclosures of which are herein incorporated by reference.

Noncurable resin compositions suitable for use in the present invention may be either used such that they form non-hardening coating or they may be combined with a multifunctional material capable of reacting with the noncurable resin compositions to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the noncurable resin composition may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Solvents suitable for use with the noncurable resin compositions include any solvent that is compatible with a particular or chosen noncurable resin composition and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Optionally, silyl-modified polyamide compounds may be used in the methods of the present invention as noncurable resin compositions, and may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

B. The Proactive Methods of the Present Invention.

The proactive methods are most suited for wells that have not been actively fractured yet. These methods can be used as a pre-treatment, such as in a "mini-frac treatment," before the main fracturing treatment or at the early stage of a fracturing treatment such as a pre-pad treatment or part of a pad fluid applied before the main proppant slurry treatment.

The proactive methods of the present invention comprise three steps. The first step is placing an aqueous tackifying treatment fluid before or as part of a pre-pad of a fracturing treatment. The second step involves fracturing a portion of the subterranean formation. This fracturing step may include the introduction of some proppant into the formation. This proppant may be coated with a resin composition, uncoated, or a combination thereof (i.e., some coated, then some uncoated, and so on). The third step involves introducing at least some coated proppant during the fracturing treatment into the fractures created in the fracturing treatment. In some embodiments, from an economic point of view, it is preferable to introduce the coated proppant at the end of the fracturing treatment. The proppant may form proppant packs in the fractures. All three steps may be performed with one or more fluid systems.

In other embodiments, the proactive methods of controlling particulates within a subterranean formation of the present invention comprise the steps of: placing an aqueous tackifying treatment fluid or a resin composition into a propped fracture that comprises proppant particulates; placing an aqueous tackifying treatment fluid into the propped fracture; and allowing the proppant particulates to form a permeable proppant pack. If desired, a spacer fluid or other treatment fluid (such as scale inhibitors, brines, etc.) may be used before the aqueous tackifying treatment fluid is introduced.

The same aqueous tackifying treatment fluids (discussed in section A1), curable resin compositions (discussed in section A2), and noncurable resin compositions (discussed in section A3) as discussed above with respect to the remedial methods of the present invention may be used in the proactive methods of the present invention as discussed.

2. Suitable Fracturing Processes.

Any suitable fracturing process may be used in conjunction with the methods of the present invention. Suitable fracturing processes may involve fracturing fluids that comprise gelling agents, foams, and/or surfactants. These processes also may involve coiled tubing, jetting, acoustical tools, or other suitable methods for placing the fracturing fluid in the desired subterranean zone.

3. Introducing Coated Proppant.

The coated proppant may be introduced as part of the fracturing process, at any point during the process. Preferably, the coated proppant is introduced towards the end of the fracturing treatment. The term "coated proppant" as used herein means proppant particulates that have been at least partially coated with a suitable resin. The proppant particulates may be coated with the resin by any suitable method. The term "coated" does not imply any particular degree of coverage of the proppant particulates with the resin.

A wide variety of particulate materials may be used as proppant in accordance with the present invention, including, but not limited to, sand; bauxite; ceramic materials; glass materials; resin precoated proppant (commercially available from Borden Chemicals and Santrol, for example, both from Houston, Tex.); polymer materials; "TEFLON™" materials; ground or crushed nut shells; ground or crushed seed shells; ground or crushed fruit pits; processed wood; composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, and solid glass; or mixtures thereof. The proppant used may have a particle size in the range of from about 2 to about 400 mesh, U.S. Sieve Series. Preferably, the proppant is graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the proppant.

The same aqueous tackifying treatment fluids (discussed in section A1), curable resin compositions (discussed in section A2), and noncurable resin compositions (discussed in section A3) as discussed above with respect to the remedial methods of the present invention may be used to coat proppant in these embodiments of the present invention.

To facilitate a better understanding of the present invention, the following examples of certain aspects of some embodiments are given. In no way should the following examples be read to limit, or define, the scope of the invention.

EXAMPLES

Fines of Brazos River sand with sieve size of 200-mesh and smaller were used to simulate formation fines. Seven grams of this formation fines material was mixed with 10 grams of 20/40-mesh Ottawa sand. The mixture was packed inside a 1-inch ID transparent acrylic flow cell for ease of observation. Ottawa sand with mesh size of 40/60 mesh was packed below and 12/20-mesh Brady sand was packed above this formation fines material. The sand column was then saturated with 3% KCl brine and then flushed with 4 pore volumes of treatment fluid comprising of (0.1% HY-CLEAN (HC-2) Surfactant (available from Halliburton Energy Services, Duncan, Okla.), 0.2% 19N Surfactant (available from Halliburton Energy Services, Duncan, Okla.), 5% activator (acetic acid/acetic anhydride blend), 1% polymer (40% solution of a polyacrylate ester polymer), and 94.3% water. The treated sand column was then placed in the oven for curing at 175° F. for 2 hours. After the curing period, flow using 3% KCl brine was established through the treated sand column with an opposite direction from that during treatment. Flow rate was started at 20 mL/min and incrementally increased to 80 ml/min. Effluents were collected for total solid analysis to help determine if fines was effectively controlled by the aqueous tackifying compound treatment. To help determine the impact of cure time at temperature, similar tests were performed, however, the cure time was increased to 4 hours and 16 hours (Table 1).

For comparison purpose with a control sample, an identical sand column was prepared, but treatment fluid was not applied and without curing at 175° F. It was observed that as soon as flow was established, fines particulate immediately began to migrate into the sand pack and produced out as part of the effluent, even at 10 mL/min. Effluents were also collected for total solid analysis (Table 1).

The results all indicated that the aqueous tackifying compound treatment was able to control fines migration at cure time longer than 2 hours and all treated columns showed improvement in fines control in comparing to that of the control (i.e., untreated column)(Table 1).

TABLE 1

| Flow Rate mL/min | Total Suspended Solids Control | Total Suspended Solids 2 Hour Curing Time | Total Suspended Solids 4 Hour Curing Time | Total Suspended Solids 6 Hour Curing Time |
|---|---|---|---|---|
| 20 | 69.4 | 38.1 | 85.6 | 3.1 |
| 40 | 139.4 | 20.8 | 10.2 | 14.1 |
| 80 | 1320 | 245.9 | 78.4 | 61.6 |
| 100 | 868.2 | 114.4 | 39 | 35.7 |

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A remedial method of controlling particulates within at least a portion of a subterranean formation, the method comprising:
   placing an aqueous tackifying treatment fluid into at least a portion of a subterranean formation, the portion of the subterranean formation comprising a proppant pack within a portion of a fracture that was previously created during a separate stimulation operation;
      wherein the aqueous tackifying treatment fluid comprises an aqueous tackifying agent selected from the group consisting of: a charged polymer; an acrylic acid polymer; an acrylic acid ester polymer; an acrylic acid homopolymer; an acrylic acid ester homopolymer; poly(methyl acrylate); poly(butyl acrylate); poly(2-ethylhexyl acrylate); an acrylic acid ester co-polymer; a methacrylic acid derivative polymer; a methacrylic acid homopolymer; a methacrylic acid ester homopolymer; poly(methyl methacrylate); poly(butyl methacrylate); poly(2-ethylhexyl methacrylate); an acrylamido-methyl-propane sulfonate polymer; an acrylamido-methyl-propane sulfonate derivative polymer; an acrylamido-methyl-propane sulfonate co-polymer; an acrylic acid/acrylamido-methyl-propane sulfonate co-polymer; and any combination thereof;
   subsequent to placing the aqueous tackifying treatment fluid, placing a resin composition comprising a solvent into the portion of the subterranean formation such that the resin composition does not penetrate the entire proppant pack;
      wherein the resin composition comprises at least one curable resin or at least one non-curable resin;
         wherein the at least one curable resin, if selected, comprises at least one resin selected from the group consisting of: a two component epoxy-based resin; a novolak resin; a polyepoxide resin; a phenol-aldehyde resin; a urea-aldehyde resin; a furan resin; a furan/furfuryl alcohol resin; a phenolic/latex resin; a phenol formaldehyde resin; an acrylate resin; and any combination thereof; and
         wherein the at least one non-curable resin, if selected, comprises at least one noncurable resin selected from the group consisting of: a condensation reaction product comprised of a polyacid and a polyamine; a polyamine; a polyacid; a trimer acid; a synthetic acid produced from a fatty acid; maleic anhydride; acrylic acid; an aldehyde; formaldehyde; a dialdehyde; glutaraldehyde; a hemiacetal; an aldehyde releasing compound; a diacid halide; a dihalide; a dichloride; a dibromide; a polyacid anhydride; citric acid; an epoxide; a furfuraldehyde; an aldehyde condensate; a silyl-modified polyamide; and any combination thereof; and forming a consolidated proppant pack after contacting the proppant pack with the aqueous tackifying agent and the resin composition.

2. The method of claim 1 wherein the resin composition has a viscosity of about 100 centipoise or less.

3. The method of claim 1 wherein the aqueous tackifying treatment fluid comprises at least one element selected from the group consisting of: a gelling agent; a scale inhibitor; a breaker; an enzyme; a surfactant; a gas; a foaming agent; a solvent; an activator; and any combination thereof.

4. The method of claim 1 wherein the resin composition comprises at least one solvent selected from the group consisting of: butyl lactate; butylglycidyl ether; dipropylene glycol methyl ether; dipropylene glycol dimethyl ether; dimethyl formamide; diethyleneglycol methyl ether; ethyleneglycol butyl ether; diethyleneglycol butyl ether; propylene carbonate; methanol; butyl alcohol; d-limonene; a fatty acid methyl ester; an aqueous dissolvable solvent; isopropanol; butanol; a glycol ether solvent; 2-butoxy ethanol; an ether of a $C_2$ to $C_6$ dihydric alkanol containing at least one $C_1$ to $C_6$ alkyl group; a mono ether of dihydric alkanol; methoxypropanol; butoxyethanol; hexoxyethanol; and any combination thereof.

5. The method of claim 1 herein the resin composition comprises at least one solvent selected from the group consisting of: butylglycidyl ether; dipropylene glycol methyl ether; butyl bottom alcohol; dipropylene glycol dimethyl ether; diethyleneglycol methyl ether; ethyleneglycol butyl ether; methanol; butyl alcohol; isopropyl alcohol; diethyleneglycol butyl ether; propylene carbonate; d-limonene; 2-butoxy ethanol; butyl acetate; furfuryl acetate; butyl lactate; dimethyl sulfoxide; dimethyl formamide; a fatty acid methyl ester; and any combination thereof.

* * * * *